Dec. 17, 1957
C. D. READ
2,816,801
AUTOMOBILE TRACTION ATTACHMENT
Filed Feb. 28, 1957
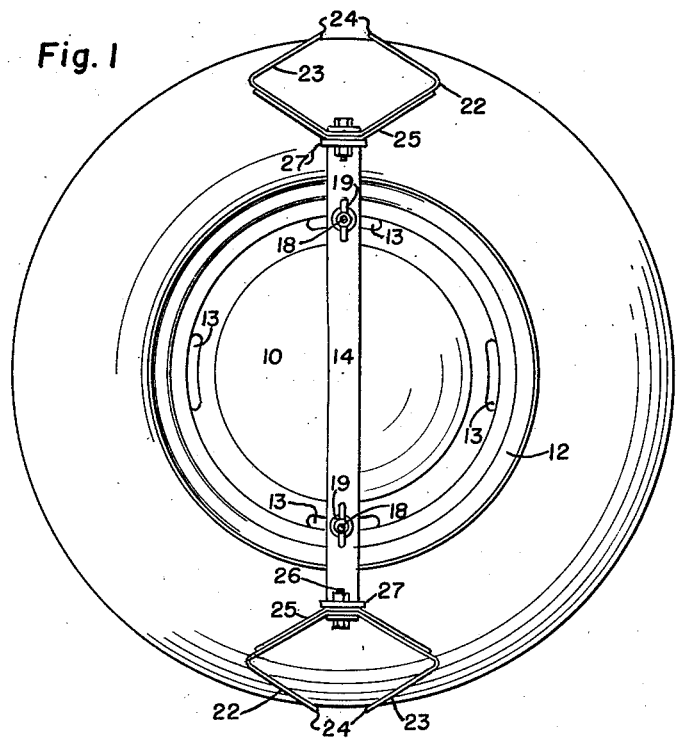
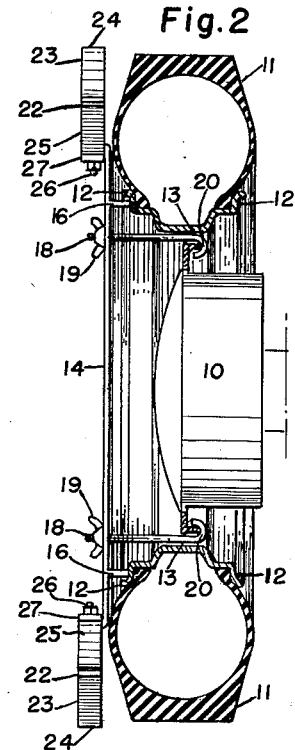
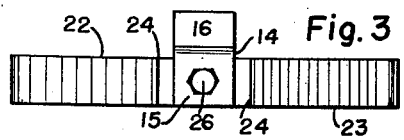
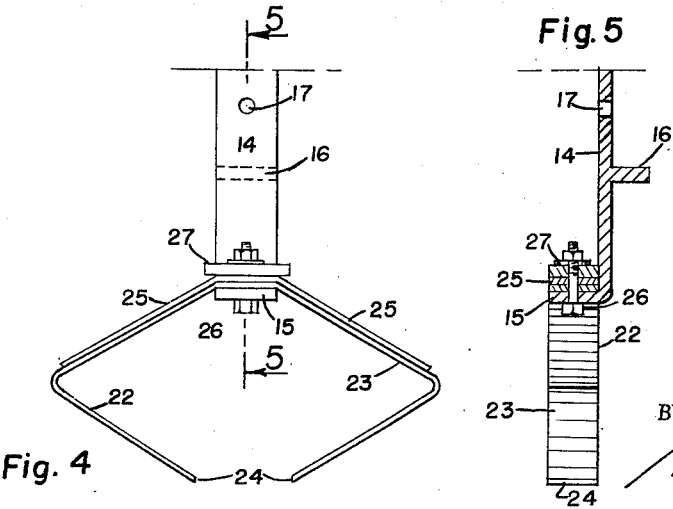
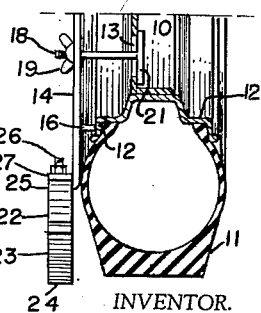
INVENTOR.
Claude D. Read.
BY
ATTORNEY.

United States Patent Office 2,816,801
Patented Dec. 17, 1957

2,816,801

AUTOMOBILE TRACTION ATTACHMENT

Claude D. Read, Longmont, Colo.

Application February 28, 1957, Serial No. 643,093

9 Claims. (Cl. 301—47)

This invention relates to adjuncts selectively and temporarily engageable with automotive traction wheels to enhance the tractive grip of the latter with respect to slippery surfaces, and has as an object to provide a novel and improved such adjunct characterized by operative efficiency and facility of use.

A further object of the invention is to provide a traction-promoting adjunct convenient of detachable operative association with automotive traction wheels of diverse type and construction.

A further object of the invention is to provide a traction-promoting adjunct for detachable association with automotive traction wheels that is simple and compact in a light-weight, easily-manipulable form.

A further object of the invention is to provide a traction-promoting adjunct for automotive traction wheels that is correspondingly effective in either direction of associated wheel rotation.

A further object of the invention is to provide a traction-promoting adjunct for automotive traction wheels that operates to supplement, rather than to in any way alter or modify, the normal tractive grip of the associated wheel.

A further object of the invention is to provide a traction-promoting adjunct for automotive traction wheels that is effectively and efficiently operable with minimum damage to surfaces thereby engaged.

A further object of the invention is to provide a traction-promoting adjunct for automotive traction wheels that is expedient and economical of production from readily-available materials in any appropriate range of particular sizes.

A further object of the invention is to provide a traction-promoting adjunct for automotive traction wheels that is adaptable to mounting on a given wheel either singly or as a multiple unit assembly, that is durable and long-lived in either continuous or repetitious use, that is susceptible of ready rehabilitation at need, and that is convenient of storage within and transport with an automotive vehicle when detached from the wheel.

With the foregoing and other objects in view, my invention consists in the construction, arrangement, and operative combination of elements as hereinafter described, pointed out in my claims, and illustrated by the accompanying drawing, in which—

Figure 1 is a side elevation of a typical automotive wheel equipped with a preferred embodiment of the invention associated for practical use therewith.

Figure 2 is a section diametrically of the wheel represented in the preceding view showing in side elevation the illustrated embodiment of the invention as operatively associated therewith.

Figure 3 is an end elevation, on a relatively enlarged scale, of the typical embodiment of the invention according to Figures 1 and 2 apart from the wheel and its attaching means.

Figure 4 is a fragmentary, detail elevation, on the same scale as Figure 3, of an end portion of the illustrated embodiment of the invention apart from the wheel and its attaching means.

Figure 5 is a fragmentary, detail section taken substantially on the indicated line 5—5 of Figure 4.

Figure 6 is a fragmentary view similar to the lower portion of Figure 2 illustrating adaptability of the improvement to operative association with wheels of diverse type and construction through simple variation of attaching means within the contemplation of the invention.

The situations wherein occasion for supplementing the normal tread traction of an automotive wheel arises are so well known and of such general experience as to require no elaboration herein. Many traction-supplementing attachments for automotive wheels have been devised for successful operation under the varying conditions prompting their use, but, in general, the difficulties of operatively associating such known devices with a wheel have made them much less than satisfactory for emergency application to resolve, especially, the quite common problems of temporary slippage on ice, snow, and mud which so frequently appear. In a practical and effectively operable construction, the instant invention is hence directed to the provision of a simple, unitary, traction-supplementing attachment that is facile and convenient of operative association with and detachment from the accessible outer surface of an automotive wheel under practically any and all conditions requiring correction of wheel slippage due to inadequate tread grip.

In the drawings, the numeral 10 designates, generally, a conventional automotive wheel of any usual structural particularity adapted to mount a pneumatic tire 11 between annular rim flanges 12 in accordance with accepted and wide-spread practice, which conventional wheels are customarily characterized by openings 13, variable as to size, number, and shape, intersecting the wheel web inwardly adjacent the rim flanges 12 in paired alignment diametrically of the wheel, the wheel organization shown and briefly described being but typical of automotive traction wheels wherewith the improvement of the instant invention is advantageously operable.

Primary to the traction-supplementing attachment of the invention is a straight, rigid bar 14 of suitable material, such as metal, expediently of a width several times as great as its thickness, whereof the ends are similarly laterally offset as ears 15 transversely of and perpendicular to the same wide side of the bar to determine a maximum bar length greater than the diameter of the rim flanges 12 and less than the diameter of the tire 11 of the wheel assembly wherewith the attachment is to be used. In a symmetrical correlation with the length of the bar 14 such as to determine like end portion sections thereof and in a separation longitudinally of the bar less than the maximum diameter of the rim flanges 12 of the wheel to which the attachment is applicable and greater than the minimum diameter of said flanges, lugs 16 fixedly outstand transversely of and perpendicular to the side of the bar 14 opposite to that from which the ears 15 project in a disposition on and an extension away from said bar such as to engage the free ends of said lugs against diametrically opposite zones of the exposed annular wall of a rim flange 12 when the bar is approached to and diametrically of the exposed side of the wheel and tire assembly with the ears 15 directed outwardly of and away from the latter, thus to locate and position the bar as a symmetrically-disposed bisector of the wheel and tire assembly exteriorly of and closely adjacent the plane common to the corresponding side wall of the tire 11, as is clearly shown in Figures 1 and 2. Holes 17 through the thickness of the bar 14 spacedly adjacent and inwardly along the bar from the lugs 16 are disposed to register with a diametrically aligned pair of the openings 13 when the bar is applied to the wheel and tire assembly as shown and above described and said bar is secured to and in such operative mounted relation with the wheel and tire assembly by means of bolts 18 whereof the threaded ends project loosely and outwardly through the holes 17 for coaction with wing nuts 19 acting against the outwardly-exposed side of the bar and the other ends are headed to the form of hooks 20, Ts 21, or the equivalent, appropriate to be entered through the contiguous opening 13 and to latchably engage with a margin, or margins, of said opening at the inner side of the wheel, whereby manipulation of the nuts 19 is made effective to detachably secure the bar 14 to and in position of use on the wheel and tire assembly in a facile and convenient manner.

The actual traction-promoting agencies of the improvement are identical spring shoe units 22 replaceably secured to and symmetrically extending outwardly of the bar 14 from the ears 15 terminating said bar. Each shoe unit 22 is constituted from an appropriate length 23 of hard, resilient, strip material, such as spring steel, bent to the approximate shape of a rhombus interrupted at one of its obtuse angles where the free ends 24 of the length 23 converge in spaced opposition, and a backing strip 25 of similar or identical material arranged to conformably overlie the closed obtuse angle and adjacent legs of the rhombus defined by the length 23 and to span thereover between the acute angles of the rhombus. At the closed obtuse angle of the rhombus, and at the corresponding zone of the strip 25, the length 23 and conforming strip 25 are flattened to an area adapted to seat on the inward face of an ear 15, whereto the length and strip assembly is secured by means of a bolt 26, expediently reinforced by a backing block 27, engaged through registered holes formed for its accommodation in the ear, length, strip and backing block. Organized in association with the bar 14 as illustrated and described, the spring shoe units 22 outstand laterally from and at each side of each end of said bar with the spaces between the free ends 24 of the lengths 23 aligned with and in extension outwardly from the opposite ends of the bar, and said shoe units are sized and shaped as to establish an overall length of bar and shoe units slightly exceeding the diameter of the wheel and tire assembly whereto the improvement is applicable, thus to provide that the free ends 24 of the length 23 of each shoe unit will yieldable and angularly engage the surface supporting the tire 11 of the associated wheel as the latter rotates carrying the bar 14 secured thereto. As should be readily apparent, one of the free ends 24 of each shoe unit 22 will bite slightly into the surface thereby engaged as an incident of wheel rotation, whereby to minimize any slippage to which the tire tread is subject in either direction of wheel rotation, and the yieldable character of the shoe units obviates any undesirable reaction due to the presence of the attachment when the wheel is rolling normally free from tread slippage.

Manifestly, one or more of the attachments typified by the bar 14 and its appurtenances may be applied to a given wheel, as conditions and preferences may determine, since it is entirely feasible to cross the bars 14 in their independent mounted relation with the available pairs of openings 13 aligned diametrically of the wheel, all of which is readily accomplished with ease and convenience whenever access to the outer side of a traction wheel may be had.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A traction attachment for selective and detachable operative association with the outer side of an automotive traction wheel characterized by a rigid rim flange spacedly and inwardly paralleling the tread periphery thereof and openings inwardly adjacent the rim flange paired diametrically of the wheel, comprising a straight, rigid bar of a length less than the wheel tread diameter and greater than the rim flange diameter, lugs fixed transversely of and projecting perpendicularly from one face of said bar in a like spacing from the ends of the bar such as to register the lugs with diametrically-opposite zones of the rim flange, means carried by said bar and releasably engageable with the wheel through paired openings thereof to secure the bar diametrically of the wheel outer side with it lugs engaging the rim flange, and resiliently-yieldable traction shoe units affixed to the ends of said bar in extension longitudinally therefrom at the outer side and radially beyond the tread periphery of the associated wheel.

2. A traction attachment for selective and detachable operative association with the outer side of an automotive traction wheel characterized by a rigid rim flange spacedly and inwardly paralleling the tread periphery thereof and openings inwardly adjacent the rim flange paired diametrically of the wheel, comprising a straight, rigid bar of a length less than the wheel tread diameter and greater than the rim flange diameter, lugs fixed transversely of and projecting perpendicularly from one face of said bar in a like spacing from the ends of the bar such as to register the lugs with diametrically-opposite zones of the rim flange, means carried by said bar and releasably engageable with the wheel through paired openings thereof to secure the bar diametrically of the wheel outer side with its lugs engaging the rim flange, terminal ears on said bar transversely of and perpendicularly projecting from the bar face remote from said lugs, and a resiliently-yieldable traction shoe unit affixed to each of said ears in extension longitudinally from the bar at the outer side and radially beyond the tread periphery of the associated wheel.

3. The organization according to claim 2, wherein the means carried by the bar for releasable engagement with the wheel comprises bolts slidably engaged at their threaded ends through the bar inwardly adjacent the lugs for coaction with nuts disposed to bear against the side of the bar remote from the lugs, and heads on said bolts receivable through the wheel openings adapted to engage elements marginally of said openings at the inner face of the wheel.

4. The organization according to claim 2, wherein the means carried by the bar for releasable engagement with the wheel comprises bolts slidably engaged at their threaded ends through the bar inwardly adjacent the lugs for coaction with nuts disposed to bear against the side of the bar remote from the lugs, and hooked heads on said bolts receivable through the wheel openings adapted to engage elements marginally of said openings at the inner face of the wheel.

5. The organization according to claim 2, wherein the means carried by the bar for releasable engagement with the wheel comprises bolts slidably engaged at their threaded ends through the bar inwardly adjacent the lugs for coaction with nuts disposed to bear against the side of the bar remote from the lugs, and T-heads on said bolts receivable through the wheel openings adapted to engage marginally with and to bridge across said openings at the inner face of the wheel.

6. The organization according to claim 2, wherein each of said traction shoe units comprises a flat strip length of spring metal transversely worked to define a rhombus open at one of its obtuse angles between spaced, outwardly-convergent, free ends of the length, and the so-formed rhombus is attached to the end of the bar at the zone of its closed obtuse angle to dispose its open angle in alignment with and remote from the bar.

7. The organization according to claim 2, wherein each of said traction shoe units comprises a flat strip length of spring metal transversely worked to define a rhombus open at one of its obtuse angles between spaced, outwardly-convergent, free ends of the length and a backing strip of spring metal adapted to conformably overlie the closed obtuse angle of the rhombus and the legs adjacent thereto, and the so-formed unit is attached to the end of the bar at the zone of the obtuse angle common to said length and strip to dispose the open angle of the rhombus in alignment with and remote from the bar.

8. The organization according to claim 2, wherein each of said traction shoe units comprises a flat strip length of spring metal transversely worked to define a rhombus open at one of its obtuse angles between spaced, outwardly-convergent, free ends of the length, the closed obtuse angle of the rhombus is flattened for coaction with a terminal ear of the bar, and the so-formed rhombus is attached to the bar by a bolt engaged through the ear and flattened area of the rhombus to dispose the open angle of the rhombus in alignment with and remote from the bar.

9. The organization according to claim 2, wherein each of said traction shoe units comprises a flat strip length of spring metal transversely worked to define a rhombus open at one of its obtuse angles between spaced, outwardly-convergent, free ends of the length and a backing strip of spring metal adapted to conformably overlie the closed obtuse angle of the rhombus and the legs adjacent thereto, the closed obtuse angle of the rhombus and the contiguous zone of the backing strip are correspondingly flattened to seat against a terminal ear of the bar, and the so-formed unit assembly is attached to the bar by a bolt engaged through the ear and flattened areas of the rhombus and backing strip to dispose the open angle of the rhombus in alignment with and remote from the bar.

References Cited in the file of this patent

FOREIGN PATENTS

| 3,868 | Netherlands | June 22, 1919 |
| 22,773 | Great Britain | Oct. 1, 1910 |
| 14,032/28 | Australia | June 23, 1928 |